United States Patent
Krishnamoorthy et al.

(10) Patent No.: US 10,108,669 B1
(45) Date of Patent: Oct. 23, 2018

(54) PARTITIONING DATA STORES USING TENANT SPECIFIC PARTITIONING STRATEGIES

(71) Applicant: XACTLY CORPORATION, San Jose, CA (US)

(72) Inventors: Vasudev Krishnamoorthy, San Jose, CA (US); Denis Gefter, San Francisco, CA (US)

(73) Assignee: XACTLY CORPORATION, San Jose, CA (US)

( * ) Notice: Subject to any disclaimer, the term of this patent is extended or adjusted under 35 U.S.C. 154(b) by 253 days.

(21) Appl. No.: 14/531,823

(22) Filed: Nov. 3, 2014

Related U.S. Application Data (60) Provisional application No. 61/969,081, filed on Mar. 21, 2014.

(51) Int. Cl.
*G06F 17/30* (2006.01)
(52) U.S. Cl.
CPC .. *G06F 17/30486* (2013.01); *G06F 17/30598* (2013.01)
(58) Field of Classification Search
CPC .................. G06F 17/30486; G06F 17/30598
See application file for complete search history.

(56) References Cited

U.S. PATENT DOCUMENTS

| | | | |
|---|---|---|---|
| 6,587,854 B1 | 7/2003 | Guthrie et al. | |
| 9,317,577 B2 * | 4/2016 | Duan | G06F 17/30584 |
| 2009/0276477 A1 * | 11/2009 | Thuringer | G06F 17/30312 |
| | | | 707/999.101 |
| 2011/0082854 A1 * | 4/2011 | Eidson | G06F 17/30463 |
| | | | 707/714 |
| 2011/0213870 A1 * | 9/2011 | Cai | H04L 67/10 |
| | | | 709/223 |
| 2011/0307450 A1 * | 12/2011 | Hahn | G06F 17/30339 |
| | | | 707/649 |
| 2013/0159659 A1 * | 6/2013 | Gelman | G06F 17/30584 |
| | | | 711/173 |
| 2015/0081666 A1 * | 3/2015 | Long | G06F 17/30442 |
| | | | 707/713 |

\* cited by examiner

*Primary Examiner* — Khanh B Pham
(74) *Attorney, Agent, or Firm* — Hickman Palermo Becker Bingham LLP (57) ABSTRACT

In an embodiment, a method is described for partitioning a data table into one or more partitions based on tenant specific partition strategies. In an embodiment, one or more tenant identifiers within a data store are identified. Each of the tenant identifiers identifies a unique tenant. The table of data is partitioned into partitions, and each partition is associated with a particular tenant identifier and comprises data associated with the particular tenant identifier. A particular partition from the partitions is partitioned into one or more sub partitions. A custom sub partition key is determined and associated, at least in part, with particular tenant identifier. In response to a data access query associated with the particular tenant identifier, a data storage unit is queried using the custom sub partition key stored in the metadata table.

20 Claims, 7 Drawing Sheets

| Subpartition Key | Tenant Identifier | Data Attribute Identifier | Data Attribute Identifier |
|---|---|---|---|
| K1 | 101a | | |
| K2 | 101b | | |
| K3 | 101c | | |
| K4 | 101d | | |
| K5 | 101a | | B1 |
| K6 | 101a | Feb2014 | |
| K7 | 101b | Jan2014, Feb2014 | |
| K8 | 101d | Dec2013 | B7 |

PARTITIONING DATA STORES USING TENANT SPECIFIC PARTITIONING STRATEGIES

BENEFIT CLAIM

This application claims the benefit of provisional application 61/969,081, filed Mar. 21, 2014, the entire contents of which are hereby incorporated by reference for all purposes as if fully set forth herein.

TECHNICAL FIELD

The present disclosure generally relates to partitioning data tables in databases. The disclosure relates more specifically to techniques for sub partitioning a partition of a data table in the context of a single data repository supporting a multi-tenant SAAS environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Among the more popular technology delivery models involves an application service provider hosting applications to which the application service provider's customers or "tenants", typically business enterprises, connect. The tenants connect to the hosted applications via a communication network interface, such as a web browser. Application service providers, in order to reduce redundancy of resources and maximize utility of existing resources, typically implement a multitenant architecture using a single set of data integrity rules or schema and a single data storage unit to store data of all their tenants.

One of the consequences of using a single schema and a single data storage unit to store data of all tenants of an application service provider is that the volume of data records within a data table inversely impacts performance when accessing data within the data table. As the volume of data rises to a critical point, performance to complete even simple queries, such as a search for a data record, suffers significantly. Additionally, performing resource intensive operations, such as deleting data records, recording statistical collection, or performing operations in bulk, for a tenant may have significant impact on performance of another tenant's operations. Generally, a data table with a large volume of data records is entirely partitioned using one partitioning method. However, such a singular partitioning method fails to remedy the performance issue experienced by an application service provider using single schema with multiple tenants.

For the application service provider, the problem of deteriorating performance is complicated by the fact that each of its tenants has different needs for its data and consequently, operations performed on a tenant's data vary according to the tenant's needs. Thus, a singular partition method applied to the entire data table fails to take into consideration a tenant's particular data needs or the frequency of data change and may even further deteriorate performance for some tenants.

Therefore, the data management field has developed a long-felt but unfulfilled need for an approach that allows an application service provider with a multitenant architecture using single schema to successfully accommodate and consider every tenant's data access needs.

DESCRIPTION OF EXAMPLE EMBODIMENTS

Partitioning data stores using tenant specific partition strategies is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Overview
   2.0 Structural and Functional Overview
   3.0 Methods of Partitioning Data Using Tenant Specific Partition Strategies and Custom Keys, and Retrieving Data Using Custom Key
   4.0 Implementation Mechanisms—Hardware Overview
   5.0 Extensions and Alternatives
   1.0 Overview In an embodiment, a method is described for partitioning a data table into one or more partitions based on tenant specific partition strategies. In an embodiment, one or more tenant identifiers within a data store are identified. Each of the tenant identifiers identifies a unique tenant. The table of data is partitioned into partitions, and each partition is associated with a particular tenant identifier and comprises data associated with the particular tenant identifier. One or more sub partition strategies for a particular partition are determined, based on data metrics associated with data in the particular partition. A particular sub partition strategy is selected from among the one or more sub partition strategies, and based on the selected sub partition strategy, one or more sub partitions of the particular partition are determined. For each sub partition strategy that is determined, a custom sub partition key corresponding to the sub partition is determined, and the particular partition is partitioned into one or more sub partitions. For each custom sub partition key corresponding to the sub partition, a record associating the key with a data attribute and a particular tenant identifier associated with the particular partition is stored in a metadata table. In response to a data access query, data storage unit is queried using a custom sub partition key stored in the metadata table.

In other embodiments, the invention encompasses a computer apparatus and a computer-readable medium configured to carry out the foregoing steps.

2.0 Structural and Functional Overview

Certain embodiments help reduce or eliminate inefficiencies caused by using a singular partition strategy for an entire multitenant data table. Certain embodiments also help reduce or eliminate inefficiencies caused by using database generated keys. In an embodiment, by utilizing a per tenant sub partition strategy and a custom sub partition key for each sub partition resulting from using a particular sub partition strategy, a data table within a data storage unit implementing a single schema to service multiple tenants may be partitioned based an individual tenant's data needs. The implementation of such an embodiment is not limited to a data storage unit with a single schema, but also may be used with any data table in any data storage unit. In any such context, partitioning a data table according to sub partition strategies described herein is expected to improve performance of accessing a particular data record within the data table and improve performance of data store operations such as inserting, modifying or deleting data records. Furthermore, the sub partition strategies described herein allow for efficient processing of large volumes of data using bulk operations such as bulk loader.

For purposes of illustrating a clear example, assume that an application service provider has multiple tenants. In a multitenant software-as-a-service (SaaS) environment, the application service provider hosts an application on an application server computer. The application is coupled to a data storage unit implementing a single data schema for all its tenants. In an embodiment, the data storage unit supports the technology of partitioning data tables. Data entered by the tenants and data generated by the application for the tenants, in response to data entered by tenants, are stored in the data storage unit. In some embodiments, the application service provider may require its tenants to group data entered by a tenant into a particular group or batch. A batch may comprise one or more data entries of a tenant and each batch may be associated with a unique batch identifier. Each batch may also be associated with a particular time period such as a week, a month, a fiscal quarter, a year, or a fiscal year. Each time period may be associated with a unique time period identifier. A particular batch may be associated with only one time period; therefore all data entries associated with the particular batch are associated with only the time period associated with the batch.

In some embodiments, the application service provider may allow the tenant to associate a data entry with a time period and group or associate the data entry into or with a batch. When a tenant is allowed to associate a time period with a data entry and a batch, then any two data entries within a batch may not have different time periods because each batch must only be associated with one time period. The mappings of a data entry to a batch, and a batch to a time period may be stored collectively or separately within the multitenant SaaS environment. Therefore, for a particular data entry, the associated batch and the associated time period may be determined even if a data table within the data storage unit does not comprise corresponding batch and period identifiers.

In some embodiments, the application service provider may configure a logical unit within an application server computer to automatically group one or more data entries into a particular batch and/or associate a particular time period with the data entry and/or batch.

To ensure that access to a particular data record within the data storage unit satisfies acceptable performance standards, data tables in a data storage unit may be partitioned, such that a particular partition may comprise a smaller set of data records than the data table in its entirety. However, the application service provider must ensure that resulting partitions satisfy the performance expectations of every tenant in accessing a data record. Therefore a partition strategy that takes into consideration a particular tenant's data usage and needs is used, in embodiments, for the application service provider to ensure that it satisfies performance standards expected by its tenants. In contrast, using a single partition strategy for all tenants typically fails to deliver the performance that tenants expect.

In an embodiment, the application service provider may configure logical rules within the application to associate a unique tenant identifier with each tenant, and to partition data tables based on tenant identifier, such that a particular partition comprises data associated with only a particular tenant identifier. In an embodiment, the data tables are stored within a data storage unit that supports the known technology of partitioning data tables. The application service provider may use the data storage unit's technology of partitioning data tables to partition data tables based on tenant identifiers. Partitions resulting from partitioning based on tenant identifiers are referred to herein as tenant-level-partitions. However, partitions based on tenant identifiers alone may still be insufficient to accommodate data needs of particular tenants or take into consideration the frequency at which a particular tenant modifies a particular set of data records.

Therefore, the application service provider will have to further partition a tenant-level-partition into one or more sub partitions. To ensure that a sub partition accommodates data needs of a particular tenant or takes into consideration the frequency at which a particular tenant modifies a particular set of data records, a strategy may be determined at the application level, based on a collection of statistics associated with the data records in a partition of a particular tenant. The strategy is referred to herein as sub partition strategy.

In an embodiment, for ease of maintenance and ease in implementing further sub partitions, each tenant-level-partition may be partitioned into a default sub partition. The default sub partition comprises all data comprised within the tenant-level-partition.

A custom sub partition key is determined for the default sub partition and a data record is stored in a metadata table associating the custom sub partition key with the tenant identifier associated with the tenant-level-partition of the default sub partition. The custom sub partition key is not a key determined by a database storage unit. Rather, the custom sub partition key is an application-level key and determined at the application level of a system, and may be associated with data attributes or application functionality, which may not be represented within the data table that is partitioned.

Analysis and recording of certain data metrics associated with data comprised within a sub partition may be configured. Examples of such data metrics may be volume of data records, the type of operations performed on a particular set of data records, and performance statistics of the operations performed on the particular set of data records. Based on data metrics, a particular sub partition strategy may be determined. For example, if data metrics associated with a default sub partition of a particular tenant indicate that the volume of data records of the default sub partition is greater than a certain threshold number of data records, and further indicate that the majority of the operations that were performed against data records were primarily against data records associated with a certain value for a particular data attribute, then the default sub partition may be split into two sub partitions, based on a sub partition strategy that partitions according to the particular data attribute. From among the two sub partitions, the new sub partition may comprise data records with a certain value or range of values for the particular data attribute and the other sub partition, the default sub partition, may comprise remaining data records. A custom sub partition key corresponding to the new sub partition may be associated with the tenant identifier and data attribute identifier of the particular data attribute, based upon which the sub partition strategy was determined. The custom sub partition key may be stored in the metadata table. The custom sub partition key for the default sub partition may remain the same as it was prior to splitting the default sub partition.

In an embodiment, data metrics associated with all data records of a particular tenant in a data table may be analyzed and recorded. Based on the associated data metrics, the application may determine a particular sub partition strategy for the data records of the particular tenant. Therefore, the determined sub partition strategy is tenant specific and the determined sub partition strategy will most likely be different for every tenant since the recorded data metrics associated with a particular tenant will vary from tenant to tenant.

In an embodiment, the application may be further configured to mirror tenant-level-partitions of the data storage unit at the application level and for each tenant-level-partition, based on the data metrics associated with data records comprised in the tenant-level-partition, the application may be further configured to determine one or more sub partition strategies. The application may be further configured to select one of the one or more determined sub partition strategies and according to the selected sub partition strategy, determine one or more sub partitions at the application level, where each sub partition may comprise a subset of data records in the tenant-level-partition. The application may determine a custom sub partition key at the application level and associate the key with one or more data attribute identifiers involved in the sub partition strategy. Furthermore, for each data record comprised in the tenant-level-partition, based on the data attribute identifiers associated with the sub partition key, the application may associate data records in the tenant-level-partition with the one or more determined sub partitions at the application level. In an embodiment, based on the determined sub partitions at the application level, the application may be configured to send instructions to data store to partition to the data table.

In an embodiment, an application controller may be configured to process data access requests by first determining all data attributes that are necessary to process the request. Then the controller may determine whether a custom sub partition key is associated with any of the necessary data attributes for the particular tenant requesting access to data. In response to determining a custom sub partition key exists for at least one of the necessary data attributes, a data storage unit may be queried using the custom sub partition key. In response, the data storage unit may search only data records within the sub partition corresponding to the custom sub partition key used in the data storage query, thus improving performance of accessing data for the particular tenant.

The approaches described herein may allow for Data Definition Language (DDL) operations to be used in situations that would otherwise require the usage of a Data Manipulation Language (DML) operation. DDL operations are preferred over DML operations because DDL operations perform significantly faster and consume fewer system resources than DML operations. For example, if a set of data records of a tenant in a data table need to be deleted, then a sub partition comprising said data records allows for the utilization of the DDL operation of TRUNCATE on the sub partition, whereas without the sub partitioning techniques described herein, only the DML operation of DELETE would be available for use. Using a TRUNCATE operation to delete records from a data table is significantly faster than a DELETE operation for those particular records.

Approaches to per tenant partition and sub partitions described herein may also allow for efficient processing of large quantities of data associated with a particular tenant without impacting performance of other operations of the data storage unit. For example, large quantities of data of a particular tenant may be inserted into a particular sub partition of a tenant by using bulk operations, such as Oracle bulk Loader, in situations that would otherwise require the usage of SQL inserts operation. Thus, consuming fewer resources for shorter period of time in processing data related tasks and substantially improving performance of the data storage unit and the application.

Partitioning of data records associated with a tenant into sub partitions also allows for monitoring and recording of data metrics specifically applicable to data records in a particular sub partition rather than the entire data table, thus providing more information related to particular data records or sets of data records.

In an embodiment, at an application server computer separate from a database system, instructions are sent to the database system for partitioning a data table into multiple partitions, wherein each partition is associated with a particular tenant identifier and comprises data associated with the particular tenant identifier, and wherein the database system supports partitioning of data tables into one or more partitions. At the application server computer separate from the database system, one or more sub partition strategies for a particular partition based on data metrics associated with data in the particular partition are determined. A particular sub partition strategy from among the one or more sub partition strategies is selected, and based on the selected sub partition strategy, one or more sub partitions of the particular partition are determined. For each sub partition strategy that is determined, a custom sub partition key corresponding to the sub partition is determined. Instructions are sent to the database system for partitioning the particular partition into one or more sub partitions. For each custom sub partition key corresponding to the sub partition, a record is created and stored, in a metadata table, associating the key with a data attribute and a particular tenant identifier associated with the particular partition. In response to a data access query, the database system is queried using a custom sub partition key stored in the metadata table.

Using the approaches described herein for every tenant, the application service provider may accommodate data needs of all its tenants in an efficient manner and also satisfy performance expectations of its tenants.

Figure 1:
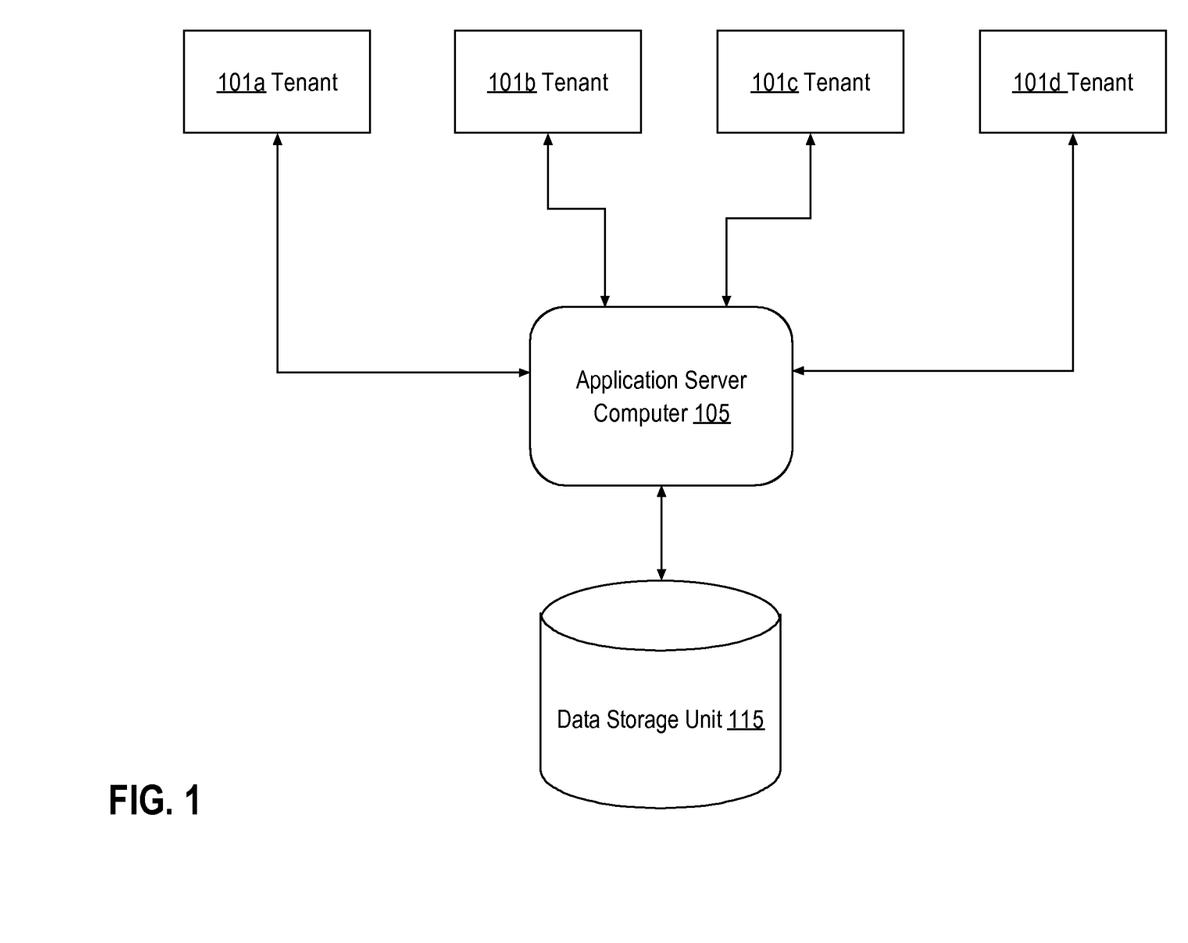
FIG. 1 illustrates an example arrangement of a multi-tenant architecture.

FIG. 1 illustrates an example arrangement of a multi-tenant architecture. A data storage unit, in this context, may be any electronic digital data recording device configured to store data according to a set of rules, in any format, and partition data records into a set of partitions and sub partitions, such as a database implementing relational database management system, or other storage units.

FIG. 1 depicts a networked computer system comprising an application server computer 105, data storage unit 115 and a plurality of tenants 101a, 101b, 101c, 101d. In this example, application server computer 105 is capable of executing procedures, such as programs, routines, scripts or other computer executable commands, for supporting a particular application hosted by the application server. Typically the application is a business application; an example is Xactly Incent, commercially available from Xactly Corporation, San Jose, Calif.

Application server computer 105 serves the tenants 101a, 101b, 101c, 101d. In one approach, the application server computer 105 is owned by, operated by, or associated with an application service provider that provides an online, real-time application program based upon Software as a Service (SaaS) environment that the multiple tenants 101a, 101b, 101c, 101d access using client computers coupled over one or more networks to the application server computer. In an embodiment, each of the tenants 101a, 101b, 101c, 101d comprises one or more computers associated with a different business enterprise that has a customer relationship with an application service provider that owns or operates the application server computer 105.

Application server computer 105 is coupled to a data storage unit 115. In an embodiment, the data storage unit 115 may be configured with a single schema for all tenants of the application service provider. With the single schema configuration, data within the data storage unit 115 may be divided between data tables that are associated with a particular application functionality rather than a particular tenant of the application. For example, if a particular application hosted by the application server computer 105 accepts sales orders, then sales orders entered by tenants 101a, 101b, 101c, 101d, may be stored in one data table called "Orders", rather than create a specific "Orders" data table for each of the tenants 101a, 101b, 101c, 101d. Data storage unit 115 may also be configured to partition every data table based on tenant identifier such that each tenant identifier is associated with a particular partition of a data table and data, within the data table, associated with a tenant identifier will be comprised within the associated partition. In an embodiment, data storage unit 115 may be further configured to determine a default sub partition for every partition and all data comprised within the default sub partition will also be comprised in the default sub partition. In an embodiment, data is associated with a particular tenant identifier when data is entered or recorded by the tenant associated with the particular tenant identifier.

Figure 2:
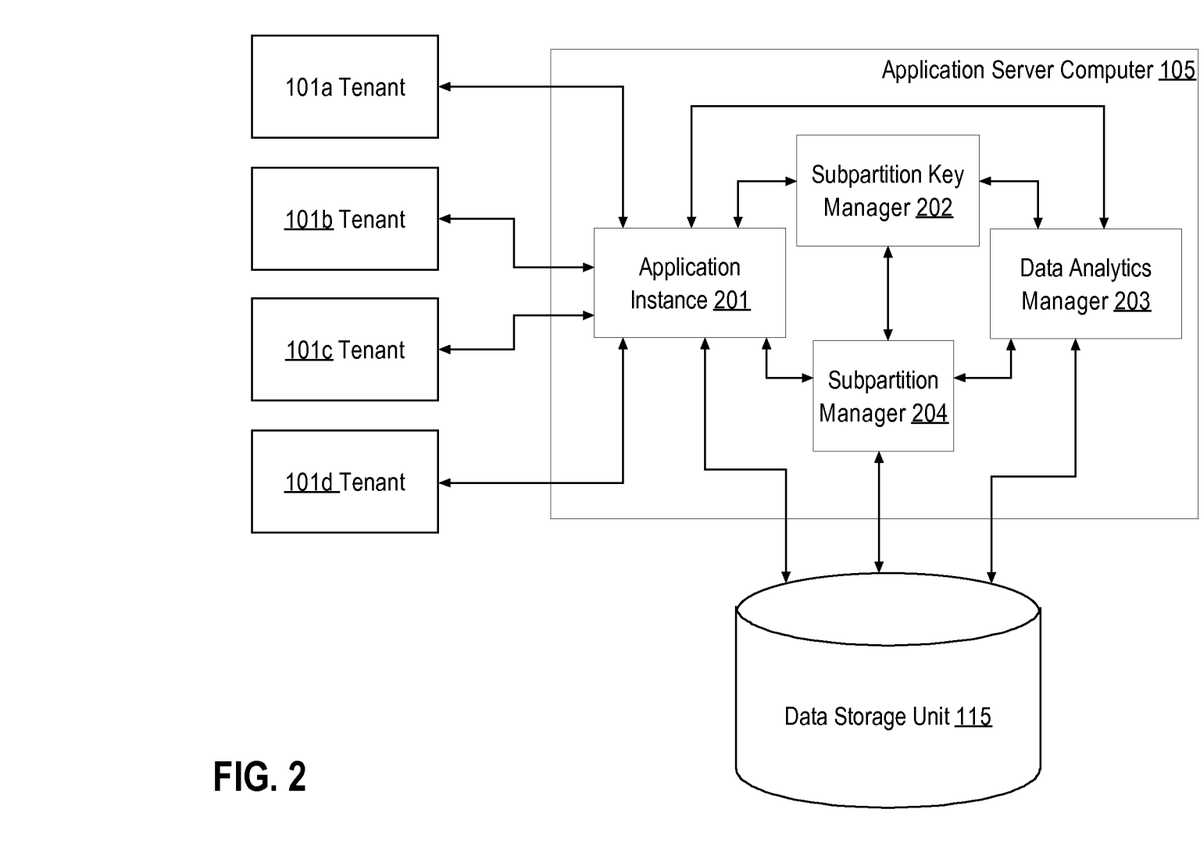
FIG. 2 illustrates an embodiment of an application server coupled to a data storage unit implementing a single schema.

FIG. 2 illustrates functional logic of an embodiment as implemented in an application server computer.

In an embodiment, the application server computer 105 may comprise a plurality of hardware and software logic components, including application instance 201, sub partition key manager 202, data analytics manager 203, and sub partition manager 204, to enable per tenant partitioning and sub partitioning data tables. Application instance 201 may represent an executable version of a particular application program. Tenants 101a, 101b, 101c, 101d, are capable of connecting to the application instance 201. In an embodiment the application instance 201 may include or may be coupled to an HTTP server and may be configured to serve HTML documents that browser programs at the tenants can receive, render and display.

Tenants 101a, 101b, 101c, 101d may enter, query, view or retrieve data via a user interface of application instance 201. In an embodiment, the application instance 201 may be configured to associate a tenant identifier with each of the tenants 101a, 101b, 101c, 101d. In this context, a tenant identifier uniquely identifies a tenant with an application service provider's network or SaaS environment. Application instance 201 may also be coupled to the data storage unit 115 and may be configured to store data in the data storage unit 115 and query data storage unit 115 in response to a data access request from tenants 101a, 101b, 101c, 101d. Application instance 201 may also be coupled with other logical units including sub partition key manager 202, data analytics manager 203, and sub partition manager 204.

In an embodiment, sub partition key manager 202 may be configured to determine a custom sub partition key for each sub partition of a data table within data storage unit 115. In this context, a custom sub partition key is a unique identifier that is generated at the application level of a multitenant SaaS architecture rather than by a data storage unit of the multitenant SaaS architecture. In an embodiment, for each custom sub partition key determined by sub partition key manager 202, a data record is stored in a metadata table, associating the custom sub partition key with a tenant identifier associated with the corresponding sub partition and with one or more data attributes or application functionality, upon which the corresponding sub partition of the data table was determined. Sub partition key manager 202 may also be coupled with other logical units including application instance 201, data analytics manager 203, and sub partition manager 204.

In an embodiment, data analytics manger 203 may be coupled with data storage unit 115. In an embodiment, data analytics manager 203 may be configured to monitor, analyze and record certain data metrics associated with data comprised within a sub partition of a data table within the data storage unit 115. The data metrics may be any statistic related to data records within a data store, including, but not limited to, volume of data records associated with a particular tenant, volume of data records within a particular partition or sub partition of a data table, type of operations performed on a particular set of data records by the associated tenant, and performance statistics of those operations, any other data metric an application service provider may determine. In an embodiment, data analytics manger 203 may also be coupled with sub partition key manager 202, sub partition manager 203, and application instance 201.

In an embodiment, sub partition manager 204 may be coupled to data storage unit 115, and application instance 201, sub partition key manager 202, and data analytics manager 203. In an embodiment, sub partition manager 204 may be configured to determine a sub partition strategy, based on data metrics associated with a particular tenant and recorded by data analytics manager 203. Sub partition manager 204 may also be configured to communicate with sub partition key manager 202 to determine a custom sub partition key for each new sub partition determined as necessary by the sub partition manager 204.

In an embodiment, the sub partition strategy to be determined or selected, by the sub partition manager 204, for certain data metrics, may be defined by the application service provider. For example, application service provider may specify that when the volume of data records within a sub partition exceeds a certain threshold number, the sub partition strategy to be determined for the sub partition should be to split the sub partition by a particular time period such as by fiscal quarter, by month, or by week. By further sub partitioning only that particular sub partition using a sub partition strategy selected based on certain data metrics associated with that particular sub partition, and because a sub partition may only be associated with one particular tenant, the application service provider is able to partition a particular tenant's data based on statistics associated with data of only that particular tenant. Therefore, the application service provider is able to specify tenant specific strategies and accommodate data needs and usage of every tenant. In an embodiment, the sub partition manager 204 may be further configured to execute the partitioning of a sub partition within data storage unit 115, using the determined sub partition strategy.

Figure 3:
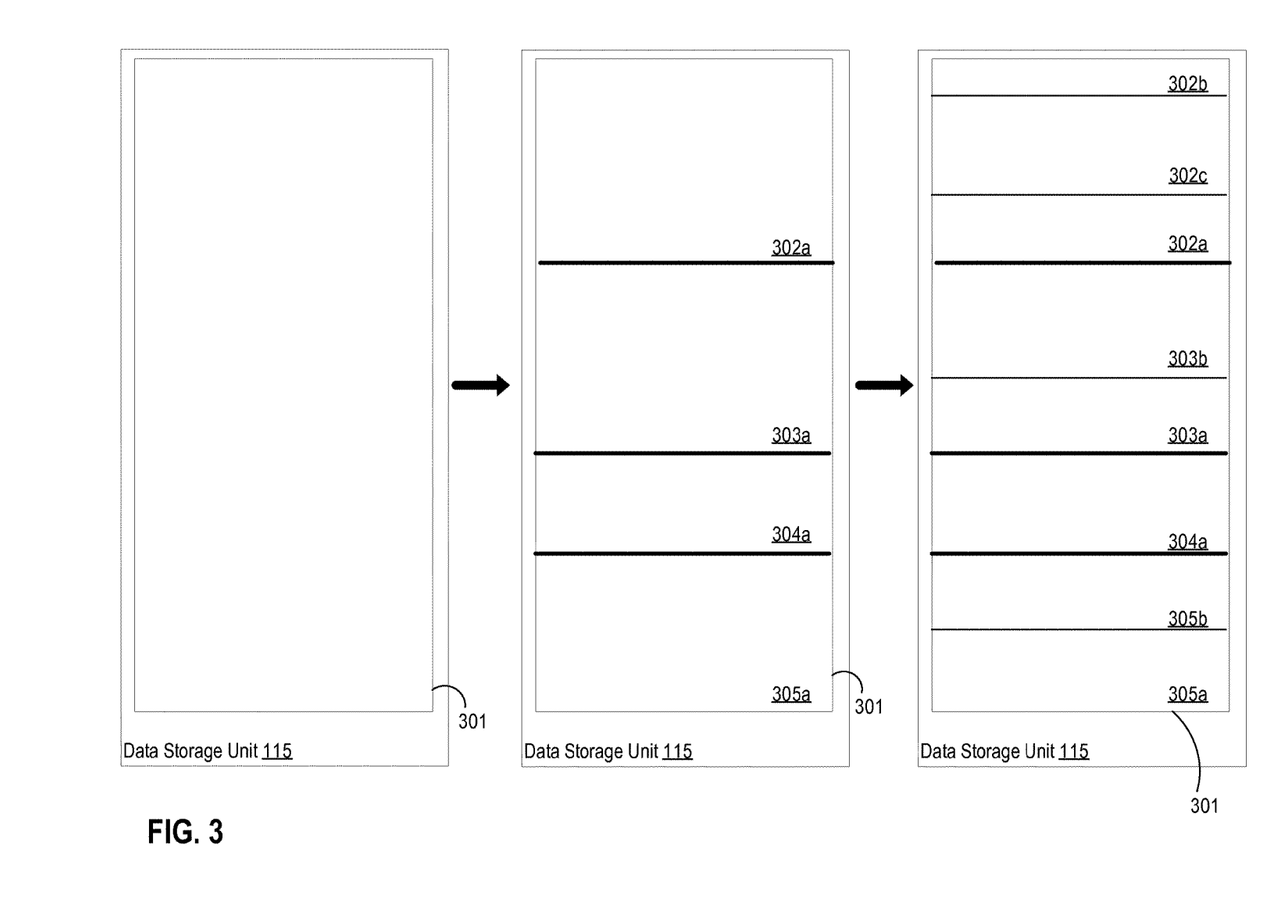
FIG. 3 illustrates an embodiment of a data table partitioned using tenant specific partition strategies.
Figure 4:
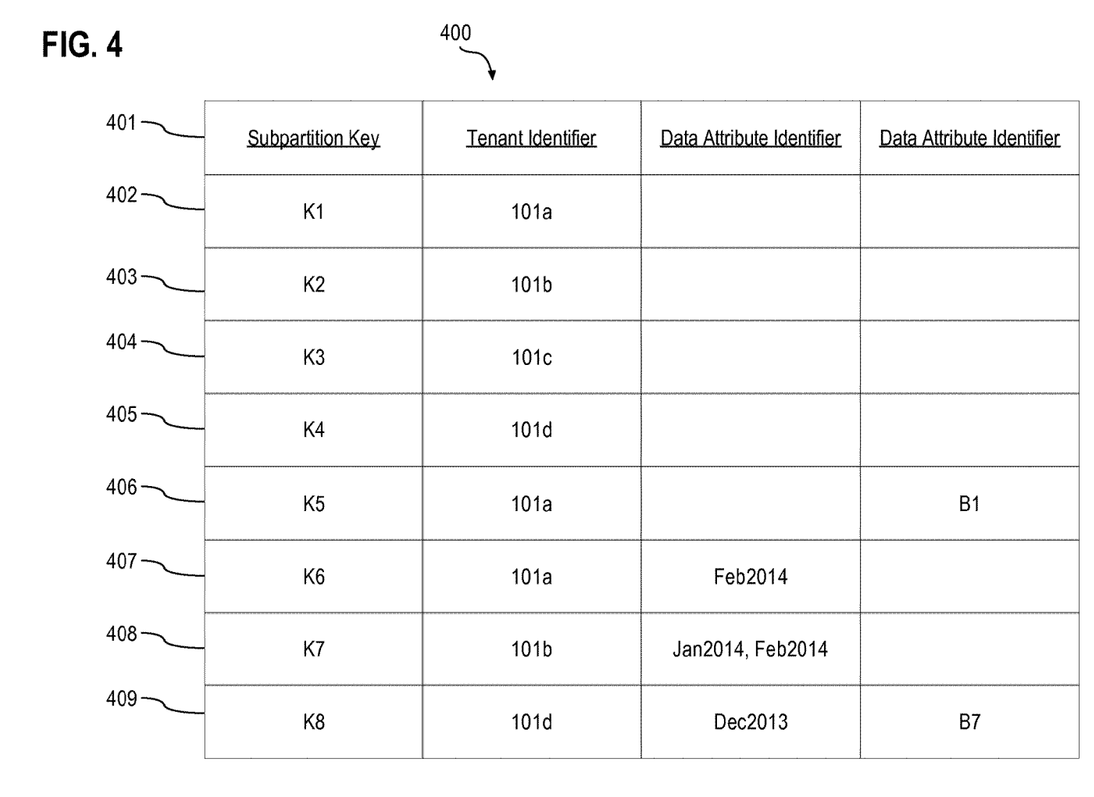
FIG. 4 illustrates an embodiment of a metadata table comprising custom keys and data attributes associated with the custom keys.

FIG. 3 illustrates an embodiment of a data table partitioned using tenant specific partitions, and FIG. 4 illustrates an embodiment of a metadata table comprising of custom sub partition keys determined at the application level and associated with sub partitions of the data table depicted in FIG. 3. For purposes of illustrating a clear example, FIG. 3 and FIG. 4 are described in the context of using tenants 101a, 101b, 101c, 101d, depicted in FIG. 1 and FIG. 2.

Data storage unit 115 may comprise at least one data table 301. In an embodiment, data table 301 may be initially partitioned based upon tenant identifiers of 101a, 101b, 101c, 101d, resulting in partitions 302a, 303a, 304a, 305a. Partition 302a may be associated with tenant identifier of 101a and may comprise all data records, within data table 301, that are associated with tenant identifier of 101a. Partition 303a may be associated with tenant identifier of tenant 101b and may comprise all data records, within data table 301, that are associated with tenant identifier of 101b. Partition 304a and 305a may be associated with tenant identifiers of tenant 101c and 101d, respectively, and may comprise all data records that are associated with tenant identifiers of 101c and 101d within data table 301, respectively.

Partitions 302a, 303a, 304a, 305a, may be referred to as tenant-level-partitions, and each partition of the tenant-level partitions may be partitioned into a default sub partition. A default sub partition may comprise all data records and each default sub partition may be associated with a unique custom sub partition key, determined and maintained, at the application level. Since a default sub partition comprises all data records of the tenant-level-partition, in this embodiment, partitions 302a, 303a, 304a, 305a may also represent respective default sub partitions. Example custom sub partition keys associated with default sub partitions 302a, 303a, 304a, 305a are depicted in FIG. 4. FIG. 4 is an embodiment of the metadata table comprising of custom sub partition keys. Each record within the metadata table 400 of FIG. 4 associates a unique custom sub partition key with at least a tenant identifier. The custom sub partition keys associated with default sub partitions 302a, 303a, 304a, 305a are K1, K2, K3, K4, respectively, represented in records 402, 403, 404, 405, respectively.

As depicted by record 402, custom sub partition key K1 is associated with tenant identifier 101a because sub partition 302a is associated with tenant identifier 101a. Similarly, records 403, 404, 405 depict the association between custom sub partition keys K2, K3, K4 and tenant identifiers 101b, 101c, 101d. Each custom sub partition key may only be associated with one tenant identifier. In this embodiment, data attribute identifier fields of records 402, 403, 404, 405 are blank because these records comprise custom sub partition keys for default sub partitions, and data within a default sub partition is partitioned only based on tenant identifiers.

Each partition or sub partition may be further partitioned if certain data metrics associated with data records within the partition or sub partition satisfy particular threshold conditions. For example, data metrics associated with data records within default sub partition 302a indicate that tenant 101a has executed majority of operations against certain data records associated with a particular batch with the batch identifier B1. Using a sub partition strategy that partitions data records based on batch identifiers, a new sub partition, sub partition 302b, may be determined such that all data records associated with batch identifier B1, within default sub partition 302a, are in sub partition 302b and the remaining data records within default sub partition 302a remain in default sub partition 302a.

Custom sub partition key K5 associated with sub partition 302b is determined and record 406 is stored in metadata table 400. Record 406 associates custom sub partition key K5 with tenant identifier 101a associated with default sub partition 302a, and with B1, the data attribute identifier involved in the sub partition strategy. Any future data access request by 101a associated with batch identifier B1 involving data records in table 301 is queried using custom sub partition key K5, which the data storage unit 115 translates to query only against data records comprised within sub partition 302b, the sub partition associated with K5.

Data metrics associated with data records within default sub partition 302a may indicate that a volume of data records associated with the month of February, 2014, with a time period identifier of Feb2014, exceeds a threshold number. Using a sub partition strategy that partitions data records based on time period identifiers, rather than batch identifiers, another sub partition, sub partition 302c, may be determined such that all data records associated with period identifier Feb2014, within default sub partition 302a, are now comprised within sub partition 302c and the remaining data records within default sub partition 302a remain in default sub partition 302a. Custom sub partition key K6 associated with sub partition 302c is determined and record 407 is stored in metadata table 400. Record 407 associates custom sub partition key K6 with tenant identifier 101a associated with default sub partition 302a, and Feb2014, the data attribute identifier involved in the sub partition strategy.

Therefore, the application service provider is able to partition data records associated with one particular tenant using two different sub partition strategies, thereby accommodating two specific data needs of tenant 101a while still satisfying performance expectations of the tenant for accessing its data.

Data metrics associated with data records within default sub partition 303a may indicate that the volume of data records in default sub partition 303a exceeds a threshold number, and may further indicate that the majority of the data records are associated with months of January 2014 and February 2014, with period identifiers of Jan2014 and Feb2014 respectively. A sub partition strategy that partitions data records based on two time period identifiers may be used to split default sub partition 303a into a new sub partition 303b and the existing default sub partition 303a. In this approach, all data records associated with period identifiers Jan2014 or Feb2014 in default sub partition 303a are partitioned into sub partition 303b and the default sub partition 303a comprises the remaining data records. Custom sub partition key K7 may be determined for sub partition 303b and data record 408 may be stored in metadata table 400. Record 408 associates K7 with tenant identifier of sub partition 303b and the data attributes involved in the sub partition strategy. Any future data access request for data records associated with period identifiers Jan2014 or Feb2014 will query data storage unit 115 using sub partition key K7 and consequently will query only data records within sub partition 303b, thereby improving performance of the data access request.

Thus, determining and maintaining custom sub partition keys at the application level allows the application service provider to implement multiple sub partition strategies on one data table and accordingly sub partition data table.

Determining and maintaining custom sub partition keys at the application level also allows the application service provider to combine multiple data attributes. For example, assume that data metrics associated with data records within sub partition 305a indicate that the volume of data records within sub partition 305a exceeds a threshold number, but data metrics also indicate that vast majority of data operations are only executed against data records associated with either period identifier Dec2013 or batch identifier B7. Therefore, a sub partition strategy may combine the period identifier and batch identifier, and may partition data records within sub partition 305a into sub partitions 305b, 305a, where sub partition 305b comprises data records that are associated with either a period identifier Dec2013 or batch identifier B7, and the default sub partition 305a comprises the remaining data records. Record 409 represents the association of sub partition key K8 with period identifier Dec2013 and batch identifier B7 along with K8 associated with tenant identifier 101d, the tenant identifier associated with 305a. Any future data access requests by tenant 101d for data records within table 301, associated with either tenant identifier Dec2013 or batch identifier B7, will use custom sub partition key K8 in record 409 and will query sub partition 305b to retrieve the records.

Figure 5:
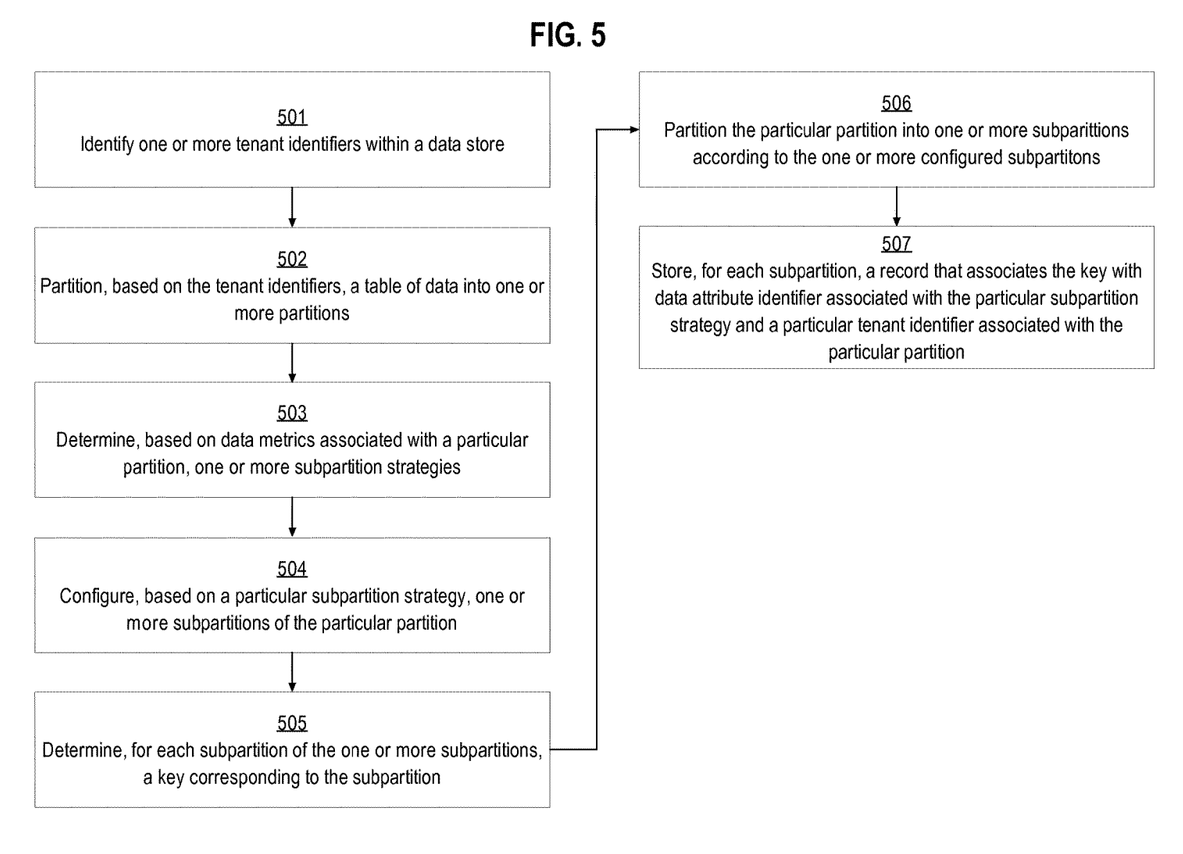
FIG. 5 illustrates a method of partitioning data table using tenant specific partition strategies and custom keys.

3.0 Methods of Partitioning Data Using Tenant Specific Partition Strategies and Custom Keys, and Retrieving Data Using Custom Key FIG. 5 illustrates an example method of partitioning a data table using tenant specific partition strategies and custom sub partition keys. In an embodiment, the operations described in FIG. 5 may be performed by the application server computer 105 of FIG. 1, FIG. 2, but other embodiments may implement same functions in other contexts using other computing devices. Moreover, the procedural blocks shown in FIG. 5 may serve as programming instructions and/or an algorithm for implementing a special-purpose computer to implement the inventive techniques.

In block 501, one or more tenant identifiers within a data store are identified. In an embodiment, each tenant identifier is associated with a particular tenant associated with the multitenant SaaS environment. For example, block 501 may involve executing a timer process, scheduling process or other algorithm for periodically selecting a particular one or more tenant identifiers for processing from among all configured tenant identifiers. Alternatively, stored configuration data may specify which tenant identifiers to use.

In block 502, the data table is partitioned into one or more partitions. In an embodiment, partitioning of the data table into one or more partitions may be based on the tenant identifiers, and each partition may be associated with a particular tenant identifier and each tenant identifier may be associated with only one partition. Partitioning may be accomplished by sending one or more partitioning commands or instructions programmatically to a relational database system that offers the capability to establish partitions.

In block 503, one or more sub partition strategies are determined based on data metrics associated with a particular partition. Each sub partition strategy may be stored in the form of instructions or rules in a specified table of the relational database system or in configuration data or files.

Each sub partition strategy comprises one or more rules, definitions or instructions that indicate how to divide the records of a tenant from a partition into one or more sub partitions and may specify ranges of time, a total number of records (for example one hundred thousand records), metadata values that are tenant-specific such as geo-location, office or business unit associated with a record, or other criteria for determining when records should go into a new sub partition.

In block 504, one or more sub partitions are configured, based on a particular sub partition strategy of the one or more sub partition strategies. Configuring a sub partition may comprise determining the number of required sub partitions to hold all records of a tenant partition, and then issuing instructions to the database system that are effective in allocating the required number of sub partitions.

In block 505, for each sub partition of the one or more sub partitions, a custom sub partition key corresponding to the sub partition is determined.

In block 506, the process partitions the particular partition into one or more sub partitions according to the configured sub partitions. In an embodiment, partitioning a particular partition may comprise issuing data storage unit commands in order to logically segregate one sub partition from another sub partition and/or to copy records from a partition to a specified sub partition.

In block 507, for each sub partition of the one or more sub partitions, a record is created and stored that associates the corresponding custom sub partition key with one or more data attributes associated with the particular sub partition strategy and with the tenant identifier associated with the partition.

Figure 6:
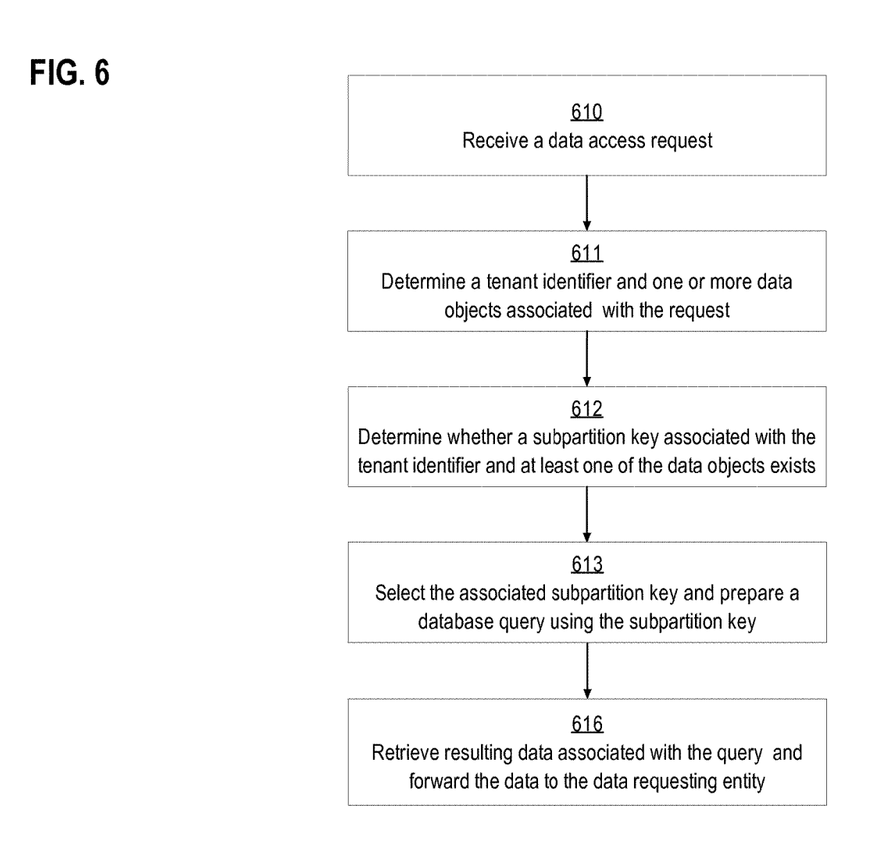
FIG. 6 illustrates a method of accessing data using a custom key.

FIG. 6 illustrates an example method of accessing data using a custom sub partition key. In an embodiment, the operations described in FIG. 5 may be performed by the application server computer 105 of FIG. 1, FIG. 2, but other embodiments may implement same functions in other contexts using other computing devices. The procedural blocks shown in FIG. 6 may serve as programming instructions and/or an algorithm for implementing a special-purpose computer to implement the inventive techniques.

In block 610, a request for data access is received. In an embodiment, the data access request may be received by an application instance comprised within application server computer 105. For example, an application instance running on the application server computer may issue a READ request for a particular record or set of records, or issue a database query for which the result set includes a particular set of records.

In block 611, a tenant identifier and one or more data objects associated with the data access request are determined. In an embodiment, the data access request may comprise the tenant identifier. In an embodiment, a data object may be a data attribute identifier such as a batch or a period identifier. In an embodiment, a data object may represent application functionality, which in turn may be associated with one or more data attributes, such as displaying a bar chart of the total number of sales in a particular month, where the data attribute may be a period identifier of that month.

In block 612, the process determines whether a custom sub partition key associated with the tenant identifier and at least one of the data objects exists in a custom sub partition key metadata table. In an embodiment, when data access requests are associated with more than one data object, the logical unit of the application server computer responsible for determining whether the associated custom sub partition key exists may be configured to search the metadata table starting with the most granular of the data objects. For example, if a particular data access request is requesting data for not just a particular month but also for a particular batch then the metadata table should be first searched to determine whether a particular batch identifier of the particular batch is associated with a custom sub partition key. If the particular batch identifier is not associated with any custom sub partition key within the metadata table, then the period identifier of the data access request may be used to search the metadata table to determine whether a particular sub partition key exists.

In block 613, in response to determining that a custom sub partition key is available in the metadata table, a database query is prepared using the custom sub partition key for querying the data storage unit.

In block 614, data resulting from executing the query against a data table within data storage unit is retrieved and forwarded to the data requesting entity.

The embodiments described herein may enable an application service provider to sub partition a data table using different sub partition strategies for different tenants and even use different sub partition strategies for data records of a single tenant. Such ability to use multiple sub partition strategies across multiple tenants may enable the application service provider to accommodate data needs of all of its tenants and satisfy performance expectations of data access for all of its tenants.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
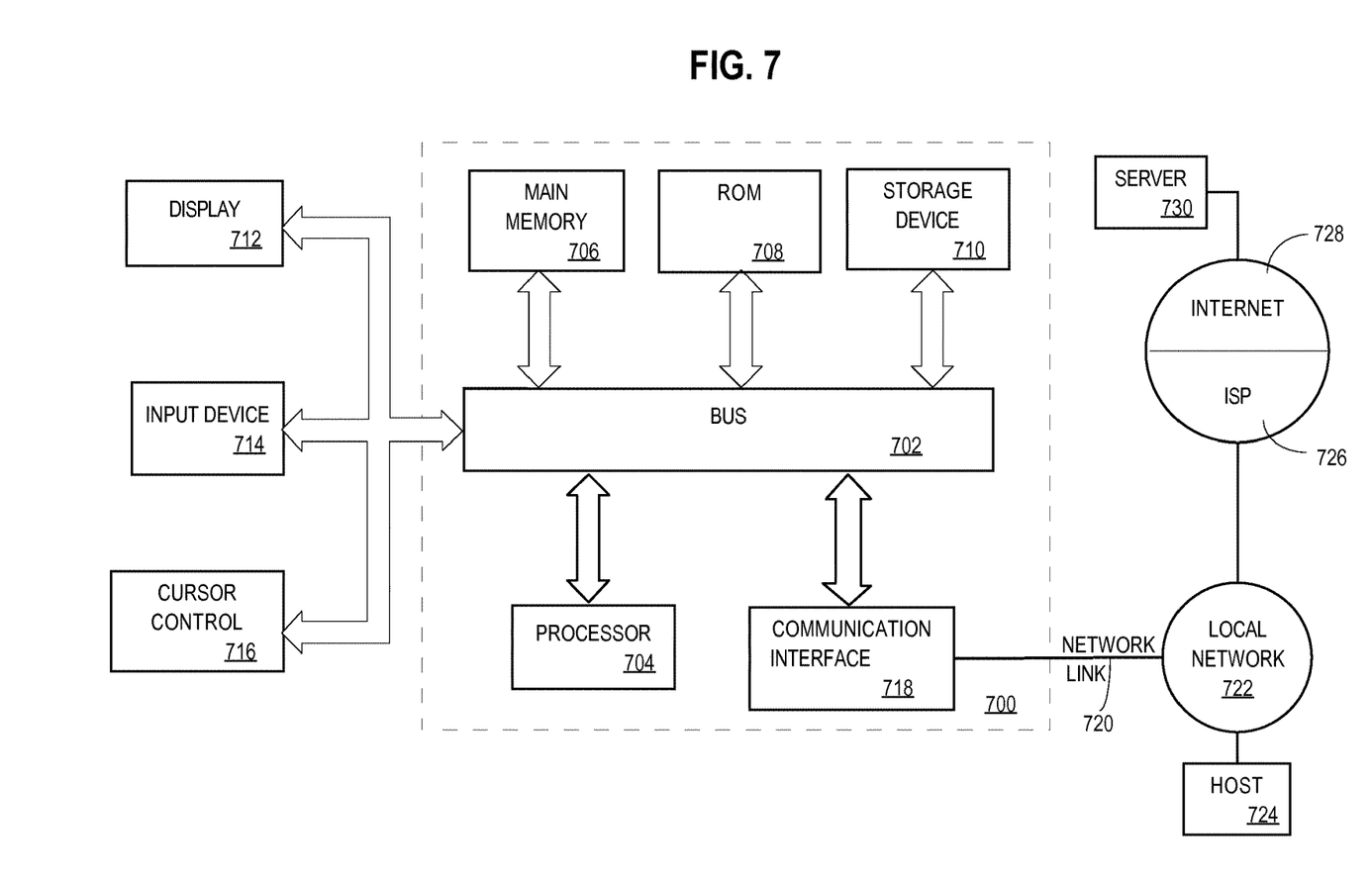
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled to bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

5.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
   identifying, at an application server separate from a database system, one or more tenant identifiers that each identify a unique tenant associated with a data store;
   sending instructions to the database system for partitioning a data table into one or more partitions, wherein the data table is associated with a first functionality of an application hosted by the application server, and wherein the first functionality relates to subject-specific data attributes, wherein each partition is associated with a particular tenant identifier of the one or more tenant identifiers and comprises data associated with the particular tenant identifier;
   sending instructions to the database system for partitioning a particular partition from the one or more partitions into one or more sub partitions;
   determining a custom sub partition key corresponding to the one or more sub partitions, wherein each custom sub partition key is associated with the first functionality of the application corresponding to the data table;
   associating the custom sub partition key, at least in part, with the particular tenant identifier;
   in response to receiving a data access query associated with the particular tenant identifier, determining a data attribute necessary for the data access query;
   determining a particular custom sub partition key that is associated with the particular tenant identifier and the data attribute;
   preparing a database query using the particular custom sub partition key;
   sending the database query to the database system for execution against a data table; and
   receiving, from the database system, a result of executing the database query against the data table.

2. The data processing method of claim 1, further comprising:
   identifying, based on a set of data metrics associated with the particular tenant identifier, a particular sub partition strategy from one or more sub partition strategies;
   partitioning, based on the particular sub partition strategy, the particular partition from the one or more partitions into the one or more sub partitions.

3. The data processing method of claim 2, further comprising determining, based on a collection of statistical measures related to a volume of data records in the particular partition, operations performed on a certain set of data records associated with a particular tenant associated with the particular tenant identifier, or performance measurement of operations performed on a particular set of data records by the particular tenant, the set of data metrics.

4. The data processing method of claim 2, further comprising determining the set of data metrics periodically at a particular time interval.

5. The data processing method of claim 1, further comprising determining, based on a collection of statistics associated with data records of a particular tenant, one or more sub partition strategies for the particular tenant.

6. The data processing method of claim 1, further comprising partitioning the particular partition into at least a default sub partition, wherein the default sub partition comprises all data records of the particular partition.

7. The data processing method of claim 1, wherein the functionality is not represented within the data table.

8. The data processing method of claim 1, further comprising associating the custom sub partition key, at least in part, with one or more data attribute identifiers, wherein the one or more data attribute identifiers are associated with a set of data records associated with the particular tenant identifier.

9. The data processing method of claim 8, further comprising: for each data record associated with the particular partition, associating, based on the one or more data attribute identifiers associated with the custom sub partition key, the data record with a particular sub partition of the one or more sub partitions.

10. The data processing method of claim 1, further comprising storing the custom sub partition key in a data store separate from the database system.

11. A computer system comprising:
an application server separate from a database system, the application server comprising one or more processors and one or more non-transitory computer-readable data storage media coupled to the one or more processors and storing one or more sequences of instructions which, when executed using the one or more processors, cause performing:
identifying one or more tenant identifiers that each identify a unique tenant associated with a data store;
sending instructions from the application server to the database system for partitioning a data table into one or more partitions, wherein the data table is associated with a first functionality of an application hosted by the application server, and wherein the first functionality relates to subject-specific data attributes, wherein each partition is associated with a particular tenant identifier of the one or more tenant identifiers and comprises data associated with the particular tenant identifier;
sending instructions from the application server to the database system for partitioning a particular partition from the one or more partitions into one or more sub partitions;
determining a custom sub partition key corresponding to the one or more sub partitions, wherein each custom sub partition key is associated with the first functionality of the application corresponding to the data table;
associating the custom sub partition key, at least in part, with the particular tenant identifier;
in response to a data access query associated with the particular tenant identifier, determining a data attribute necessary for the data access query;
determining a particular custom sub partition key that is associated with the particular tenant identifier and the data attribute;
preparing a database query using the particular custom sub partition key;
sending the database query to the database system for execution against a data table; and
receiving a result of executing the database query against the data table.

12. The computer system of claim 11, wherein the storage media further comprise sequences of instructions which, when executed using the one or more processors, cause performing:
identifying, based on a set of data metrics associated with the particular tenant identifier, a particular sub partition strategy from one or more sub partition strategies;
partitioning, based on the particular sub partition strategy, the particular partition from the one or more partitions into the one or more sub partitions.

13. The computer system of claim 12, wherein the storage media further comprise sequences of instructions which, when executed using the one or more processors, cause performing:
determining, based on a collection of statistical measures related to a volume of data records in the particular partition, operations performed on a certain set of data records associated with a particular tenant associated with the particular tenant identifier, or performance measurement of operations performed on a particular set of data records by the particular tenant, the set of data metrics.

14. The computer system of claim 12, wherein the storage media further comprise sequences of instructions which, when executed using the one or more processors, cause performing determining the set of data metrics periodically at a particular time interval.

15. The computer system of claim 11, wherein the storage media further comprise sequences of instructions which, when executed, using the one or more processors, cause determining, based on a collection of statistics associated with data records of a particular tenant, one or more sub partition strategies for the particular tenant.

16. The computer system of claim 11, wherein the storage media further comprise sequences of instructions which, when executed using the one or more processors, cause performing:
partitioning the particular partition into at least a default sub partition;
wherein the default sub partition comprises all data records of the particular partition.

17. The computer system of claim 11, wherein the functionality is not represented within the data table.

18. The computer system of claim 11, wherein the storage media further comprise sequences of instructions which, when executed using the one or more processors, cause performing associating the custom sub partition key, at least in part, with one or more data attribute identifiers, wherein the one or more data attribute identifiers are associated with a set of data records associated with the particular tenant identifier.

19. The computer system of claim 18, wherein the storage media further comprise sequences of instructions which, when executed using the one or more processors, cause performing: for each data record associated with the particular partition, associating, based on the one or more data attribute identifiers associated with the custom sub partition key, the data record with a particular sub partition of the one or more sub partitions.

20. The computer system of claim 11, wherein the storage media further comprise sequences of instructions which, when executed using the one or more processors, cause performing storing the custom sub partition key in a data store separate from the database system.

* * * * *